United States Patent
Chapman et al.

(10) Patent No.: US 7,805,155 B2
(45) Date of Patent: Sep. 28, 2010

(54) METHOD OF DETERMINING NEIGHBOR CELL SELECTION

(75) Inventors: Thomas Malcolm Chapman, Southampton (GB); David Randall, Romsey (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 263 days.

(21) Appl. No.: 11/570,762

(22) PCT Filed: Jun. 13, 2005

(86) PCT No.: PCT/GB2005/002364

§ 371 (c)(1),
(2), (4) Date: Dec. 3, 2008

(87) PCT Pub. No.: WO2005/125254

PCT Pub. Date: Dec. 29, 2005

(65) Prior Publication Data

US 2009/0213774 A1    Aug. 27, 2009

(30) Foreign Application Priority Data

Jun. 17, 2004 (GB) .................................. 0413534.9
Nov. 5, 2004 (GB) .................................. 0424510.6

(51) Int. Cl.
*H04B 7/00* (2006.01)
*H04Q 7/20* (2006.01)

(52) U.S. Cl. .................. 455/525; 455/69; 455/67.11; 455/126

(58) Field of Classification Search .............. 455/435.1, 455/434, 552.1, 435.3, 422.1, 515, 452.2, 455/512, 513, 517, 62, 67.11, 69, 522, 525, 455/126; 370/312, 332, 478
See application file for complete search history.

(56) References Cited

U.S. PATENT DOCUMENTS

| | | | |
|---|---|---|---|
| 5,794,157 A | * | 8/1998 | Haartsen ...................... 455/522 |
| 6,334,052 B1 | * | 12/2001 | Nordstrand .................. 455/411 |
| 2004/0081125 A1 | | 4/2004 | Ranta-Aho et al. |
| 2006/0234755 A1 | * | 10/2006 | Jonsson et al. .............. 455/525 |

FOREIGN PATENT DOCUMENTS

EP    1 372 350 A1    12/2003

OTHER PUBLICATIONS

Search Report for International Application No. PCT/GB2005/002364; mailed Sep. 13, 2005.
Search Report for Great Britain Application No. GB0424510.6; dated Apr. 7, 2005.

* cited by examiner

*Primary Examiner*—John Lee
(74) *Attorney, Agent, or Firm*—Staas & Halsey LLP

(57) ABSTRACT

A mobile terminal selects neighbor cell(s) to use in receiving a broadcast or multicast by deriving an estimate of cell quality for each neighbor cell; comparing the estimated quality with a minimum acceptable quality; and choosing those neighbor cells having the highest quality from the acceptable neighbor cells. The estimate of cell quality is based on a parameter of the difference between a common pilot channel transmit power and a secondary common control physical channel transmit power that is transmitted to the mobile terminal on a multimedia broadcast multicast control channel.

7 Claims, 1 Drawing Sheet

METHOD OF DETERMINING NEIGHBOR CELL SELECTION

CROSS REFERENCE TO RELATED APPLICATIONS

This application is based on and hereby claims priority to United Kingdom Application No. 0413534.9 filed on Jun. 17, 2004 and United Kingdom Application No. 0424510.6 filed Nov. 5, 2004, the contents of which are hereby incorporated by reference.

BACKGROUND

Described below is a method of determining neighbor cell selection for a mobile terminal in a broadcast/multicast.

The 3rd generation project partnership (3GPP) universal mobile telecommunications system (UMTS) cellular radio system includes a capability for the broadcast or multicast of data to multiple user equipments (UEs). To increase the reliability of the data transmission the UE is required to be able to receive transmissions from its primary or serving cell and also, if necessary, from one or more neighbor cells. The UE can then combine the signals that it receives from the plurality of cells to produce a single data stream that has a lower rate of data loss than would be obtained if decoding the primary cell alone. This combining of MBMS traffic channel (MTCH) transmissions within a cell group has been adopted for multimedia broadcast multicast service (MBMS) and the provision of neighbor cell information on MBMS control channel (MCCH) has been agreed.

However, as it is likely that, on any particular occasion, more neighbor cells will transmit data than the UE is able to receive, it is desirable for the UE to be able to select, from a number of neighbor cells offered, only those which most effectively improve the resulting single data stream.

SUMMARY

Described below is a method of determining neighbor cell selection for a mobile terminal in a broadcast/multicast includes deriving an estimate of cell quality for each neighbor cell; comparing the determined quality with a minimum acceptable quality; and choosing those neighbor cells having the highest quality from the acceptable offered neighbor cells, wherein a parameter of the difference between a common pilot channel (CPICH) transmit power and a secondary common control physical channel (S-CCPCH) transmit power is transmitted to the mobile terminal on a multimedia broadcast multicast service (MBMS) control channel, whereby the mobile terminal derives the estimate of cell quality.

The mobile terminal determines which, if any, of the neighbor cells will most enhance reliability of data transmission and chooses to accept additional transmissions from those, using a new parameter transmitted to the mobile terminal.

For the purpose of this application, reference to CPICH means primary CPICH, or P-CPICH. Sometimes there is a secondary CPICH available, but this would not always be present, so is not appropriate for implementing this method.

The quality estimate may be the SIR (Signal to Interference ratio) of the MTCH. In one embodiment, the mobile terminal estimates the SIR on the CPICH and scales this ratio according to the transmitted parameter. Alternatively, the mobile terminal derives the estimate of cell quality from a combination of network power used to transmit a physical channel carrying the broadcast/multicast data stream; spreading factor; code puncturing limit and transmission path loss between the mobile terminal and the neighbor cell.

The parameter enables the terminal to make a measurement of CPICH signal to interference ratio (SIR), or power and adjust this value in order that it is relevant to the MTCH.

Preferably, the transmission path loss is estimated as the difference between a measured common pilot reference channel received power and a common pilot channel transmit power, scaled according to the parameter.

Preferably, the selected neighbor cells are synchronized with the serving cell such that their respective transmissions do not deviate in time more than the size of a window in a radio link control combining function.

Preferably, the maximum timing difference between any two cells in a cell group does not exceed a predetermined value.

Preferably, the mobile terminal only selects neighbor cells if the serving cell MBMS traffic channel quality fails a quality condition.

BRIEF DESCRIPTION OF THE DRAWINGS

An example of a method of determining neighbor cell selection for a mobile terminal in a broadcast or multicast will now be described with reference to the accompanying drawings in which.

DETAILED DESCRIPTION OF THE PREFERRED EMBODIMENT

Figure 1:
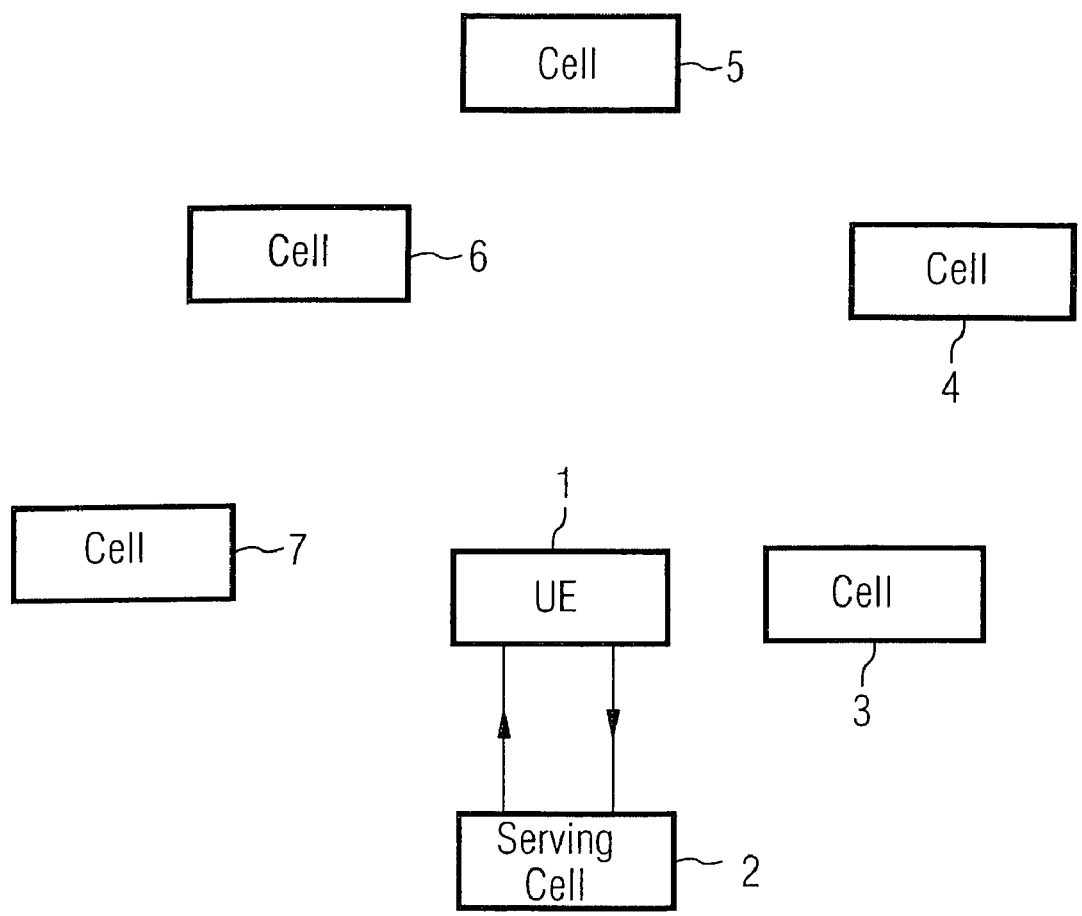
FIG. 1 is a block diagram of a typical arrangement of a mobile terminal and a number of cells for which the method described below can be applied.

Reference will now be made in detail to the preferred embodiments, examples of which are illustrated in the accompanying drawings, wherein like reference numerals refer to like elements throughout.

The example of FIG. 1 illustrates a UE 1 surrounded by a number of cells 2 to 7. Amongst these is a serving cell 2, through which the main communications to the UE occur. However, to increase the reliability as required by the 3GPP UMTS system, the UE also receives data from some neighbor cells 3 to 7. The use of neighbor cells may occur in all circumstances, or the UE may choose to select the neighbor cells, only if the UE's own serving cell fails a quality target.

In the first case, the UE always selects and uses neighbor cells, to within its capability. Selection of the best neighbor cell or cells is completed as soon as possible, and is performed taking into account the signalled parameter by which the CPICH to S-CCPCH power difference value is provided. Alternatively, the UE does not select neighbor cells unless the serving cell MTCH fails a quality condition. Based on known cell selection procedures, the UE periodically measures only the serving cell until the quality condition fails, after which all neighbor cells are assessed. If the network controls the quality condition, a threshold value is signalled as part of neighbor cell information on MCCH.

Assuming, for the purpose of this example, that the UE intends to use data from one or more neighbor cells, then the UE needs to choose the neighbor cells which will provide the most effective improvement, since the UE is limited in the number of cells which it is able to accept incoming data from, so the UE selects those which provide the highest estimated quality The selection of the cells that provide the lowest data error rate is done by the UE estimating the quality of each cell from its knowledge of the power with which the network will transmit the physical channel that carries the CPICH and the power offset of the physical channel that carries the MBMS data stream (MBMS S-CCPCH). Additional parameters, such as the spreading factor that will be used on the MBMS S-CCPCH, the code puncturing limit of the MBMS S-CCPCH and the transmission path loss between the UE and the neighbor cell can also be used. The UE is able to rank the cells in order of those likely to provide the highest quality S-CCPCH signal.

SIR can be estimated by the UE measuring the received SIR of the CPICH reference channel and scaling according to the CPICH transmit power to MBMS transmit power offset.

Transmission path loss can be estimated by the UE measuring the received power of the CPICH reference channel and subtracting the CPICH transmit power to MBMS transmit power offset. Thus, if the UE has available the value of CPICH Tx power−MBMS S-CCPCH Tx power for each cell, then the UE can estimate the relative quality of each of the neighbor cell transmissions and select those which are best. In practice, the MBMS S-CCPCH Tx power tends to be greater than the CPICH Tx power, so to maintain a positive result the network calculates and transmits the parameter as MBMS S-CCPCH Tx power−CPICH Tx power for each neighbor cell. One option is for these parameters to be transmitted with other neighbor cell information on the MBMS Control Channel (MCCH).

Given that selective combining of MTCH transmissions made within cell groups forms part of MBMS operation, it can be expected that specified minimum UE capabilities will identify a minimum number of neighbor cells that a UE must be capable of receiving simultaneously at specified rates or transmission time interval (TTI) lengths. Since generally this is likely to be less than the number of neighbor cells that are identified in the MCCH transmissions the UE has to determine a subset that it can receive. It is assumed that the UE always receives the MTCH transmission of its serving cell and that the neighbor cells will be a subset of the cells identified in system information block (SIB) 11/12.

A further improvement is to adopt a default value of zero and apply a cell specific offset. Thus, in this case the parameter will be S-CCPCH Tx power−CPICH Tx power−cell specific offset=0. This means that if a parameter is not signalled a value of zero can be assumed. If the offset is set to the most common value for S-CCPCH Tx power−CPICH Tx power amongst all neighbor cells, then this can be used to minimize the number of neighbor cells for which the parameter has to be signalled, thereby reducing the signalling overhead. In addition, the offset reduces the parameter dynamic range.

It is possible to use an offset because the UE only needs to select the best neighbor cells, i.e. to place them in rank order as referred to above. For each neighbor cell, i, only the value of $r_i$=(S-CCPCHi Tx−P-CPICHi Tx−offset)+measured P-CPICHi needs to be formed to be able to place the neighbor cells in rank order and choose the best, since the offset is common to all neighbor cells and consequently does not affect their rank order.

Selecting which neighbor cells to receive is carried out autonomously in the UE with an assumption of two constraints. The first of these is that the UE should select only neighbor cells such that the timing offset between the serving and neighbor cells does not exceed a threshold. The second assumption is that the neighbor cells should provide the best, or at least within a measure of the best, quality of all neighbor cells that are available. The quality measure may be based on SIR or block error rate (BLER) estimated from MBMS transmit power, spreading factor and code rate.

The timing offset requires UTRAN input, but the quality control can be completed either using rules specified by standards using parameters provided by the network, or using UE specific rules that are tested via performance testing. Synchronization of the serving and all selected neighbor cells is such that their transmissions do not deviate in time by more than the size of the window that is used by the RLC selective combining function. To achieve this requirement the transmissions within a cell group are controlled so that the maximum timing difference between any two cells in a cell group does not exceed a known value. This maximum timing difference, translated into numbers of RLC protocol data units (PDUs), is transmitted on MCCH and used by the UE as the selective combining window size. Timing accuracy can then be excluded from any neighbor cell selection process. The maximum window size is defined by the minimum UE capability.

Other modes of operation are possible, such as identifying for each neighbor cell a maximum timing deviation and arranging for the UE to select only those cells that are within its capability to receive. This allows greater flexibility in UE capability and cell transmission timing, but such flexibility is not always necessary or desirable when the added complexity of such a mode is taken into account.

The UE autonomously selects the neighbor cells that it uses and this selection must meet the necessary quality requirements. The UE makes an initial selection whenever a bearer is established and whenever it performs cell reselection whilst receiving a point to multipoint (p-t-m) bearer. In each case there may be a delay whilst the UE makes measurements of neighbor cells and makes the selection and consequently there may be a period where it receives only the serving cell. In the case of cell reselection the delay may include the time taken to receive MCCH and possibly SIB 11/12.

Using known measurement practice for cell reselection for the neighbor cell selection, means that the UE completes measurements for all neighbor cells that are listed in MCCH before deciding on a correct choice. Alternatively, the UE can measure until a suitable cell is found, then accept that one only. If the UE can accept more than one neighbor cell, this process continues until the desired number have been accepted.

Where a UE is using neighbor cells then, from time to time, it is necessary to re-assess the appropriateness of the chosen neighbor cells, which can be done in a number of ways. One option is that the neighbor cells are replaced only if their quality falls below a given threshold. The UE periodically measures only the neighbor cells in use until the predetermined quality condition fails, after which an assessment of all cells is made. If the network controls the quality condition, a threshold value can be signalled as part of neighbor cell information on MCCH.

An alternative method is that all neighbor cells are assessed periodically and the best adopted for use. No control parameters are required by this method, but the minimum period between periodic updates is specified. Changing the cells from which transmissions are made should not disrupt operation of the RLC selective combining function, so it is not expected that there would be significant costs from changing neighbor cells.

Control over the way in which neighbor cells are selected/re-selected could be set out as part of the standard or left to each service provider to determine. If the control formed part of the standard and specified rules for UE neighbor cell selection and reselection, then selection/reselection trigger parameters may be included. In either case, relative S-CCPCH and CPICH Tx power information may be required from the UTRAN to allow the UE to compare cells e.g. if CPICH RSCP were to be used as a comparison measure.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of determining neighbor cell selection for a mobile terminal in a broadcast or multicast, comprising:
    transmitting, to the mobile terminal on a multimedia broadcast/multicast service control channel, a parameter of the difference between a common pilot channel transmit power and a secondary common control physical channel transmit power;
    deriving, at the mobile terminal, an estimate of cell quality for each neighbor cell;
    comparing the estimate of quality with a minimum acceptable quality to identify acceptable neighbor cells; and
    choosing selected neighbor cells having highest quality from among the acceptable neighbor cells.

2. A method according to claim 1, wherein said deriving by the mobile terminal includes:
    estimating a signal to interference ratio on the common pilot channel; and
    scaling the signal to interference ratio according to the parameter transmitted on the multimedia/broadcast multicast service control channel.

3. A method according to claim 1, wherein said deriving the estimate of cell quality by the mobile terminal includes obtaining a combination of network power used to transmit a physical channel carrying a broadcast/multicast data stream, derived from primary pilot physical channel power, the parameter transmitted on the multimedia/broadcast multicast service control channel, spreading factor, code puncturing limit and transmission path loss between the mobile terminal and a corresponding neighbor cell.

4. A method according to claim 3, further comprising estimating the transmission path loss as a difference between a measured common pilot reference channel received power and a common pilot channel transmit power, scaled according to the parameter transmitted on the multimedia/broadcast multicast service control channel.

5. A method according to claim 4, further comprising synchronizing the selected neighbor cells with a serving cell so that respective transmissions from the selected neighbor cells do not deviate in time more than a size of a window in a radio link control combining function.

6. A method according to claim 5, wherein said choosing selects among the acceptable neighbor cells so that a maximum timing difference between any two cells in a cell group does not exceed a predetermined value.

7. A method according to claim 6,
    further comprising comparing a serving cell MBMS traffic channel quality with a quality condition, and
    wherein said choosing is performed when the serving cell multimedia broadcast multicast service traffic channel quality fails the quality condition.

* * * * *